United States Patent [19]

Steinkötter

[11] Patent Number: 5,113,570
[45] Date of Patent: May 19, 1992

[54] METHOD AND APPARATUS FOR SHAPING BELT STRAPS TO ENABLE THEM TO BE PULLED THROUGH SUPPORT ROLLER STATIONS

[75] Inventor: Franz-Albert Steinkötter, Walberberg, Fed. Rep. of Germany

[73] Assignee: O & K Orenstein & Koppel Aktiengesellschaft, Berlin, Fed. Rep. of Germany

[21] Appl. No.: 445,717

[22] PCT Filed: Jun. 9, 1988

[86] PCT No.: PCT/EP88/00511
§ 371 Date: Dec. 11, 1989
§ 102(e) Date: Dec. 11, 1989

[87] PCT Pub. No.: WO88/09760
PCT Pub. Date: Dec. 15, 1988

[30] Foreign Application Priority Data

Jun. 11, 1987 [DE] Fed. Rep. of Germany ....... 3719454
Jul. 10, 1987 [DE] Fed. Rep. of Germany ....... 3722838

[51] Int. Cl.⁵ ............................................. B23P 19/04
[52] U.S. Cl. .................................... 29/433; 29/446; 29/450; 29/451; 29/241
[58] Field of Search ............... 29/446, 450, 451, 452, 29/235, 241, 433

[56] References Cited

U.S. PATENT DOCUMENTS

| | | | |
|---|---|---|---|
| 3,001,270 | 9/1961 | Friedman | 29/433 |
| 3,110,093 | 11/1963 | Johnson | 29/241 |
| 3,171,193 | 3/1965 | Bowden | 29/433 |
| 3,193,432 | 7/1965 | Baines | 29/235 |
| 3,360,894 | 1/1968 | Sharman et al. | 29/450 |
| 3,429,422 | 2/1969 | Yoshimura | 198/699.1 |
| 3,601,940 | 8/1971 | Simon | 29/450 |
| 4,723,653 | 2/1988 | Engst | 198/819 |

FOREIGN PATENT DOCUMENTS

| | | | |
|---|---|---|---|
| 0104808 | 6/1983 | Japan | 198/819 |
| 0244705 | 12/1985 | Japan | 198/819 |
| 0007127 | 1/1986 | Japan | 198/819 |
| 2094741 | 9/1982 | United Kingdom | |
| 2094741 | 9/1982 | United Kingdom | 198/819 |
| 2177994 | 2/1987 | United Kingdom | 198/819 |

*Primary Examiner*—P. W. Echols
*Assistant Examiner*—David P. Bryant
*Attorney, Agent, or Firm*—Spencer, Frank & Schneider

[57] ABSTRACT

A process and a device enable tubular straps to be pulled or guided through support roller stations. The strap is rolled until the diameter (D) of the roll is less than the operating diameter (D') and is held in this position by a clamping means which moves with it, such as a mesh sleeve. The desired diameter of the strap is obtained by means of a device whose diameter decreases like that of a nozzle.

20 Claims, 1 Drawing Sheet

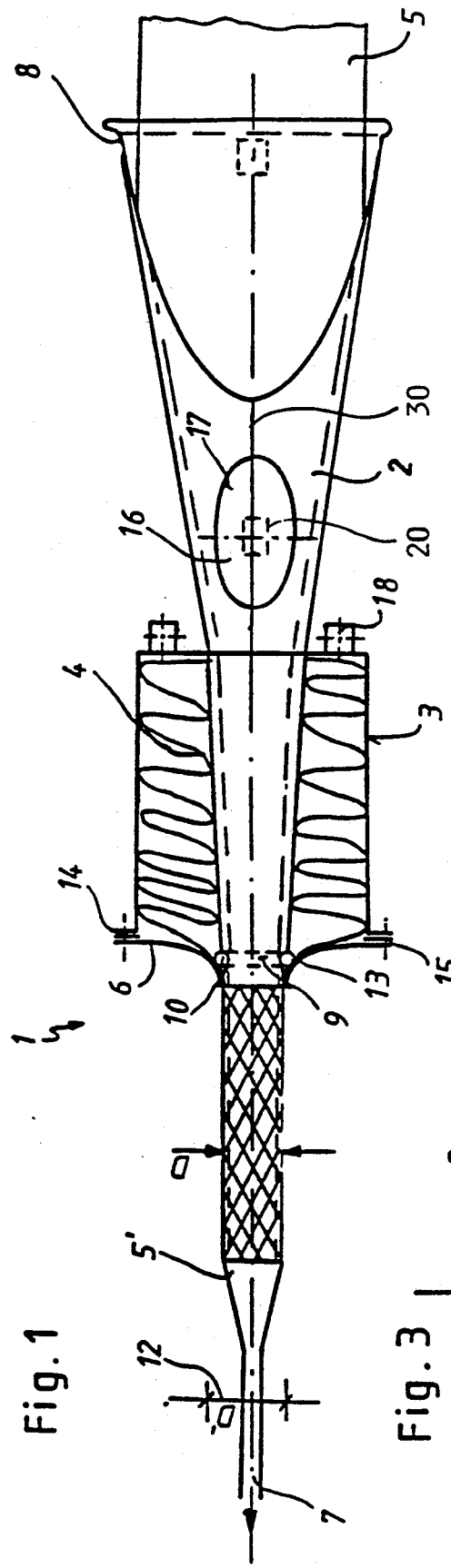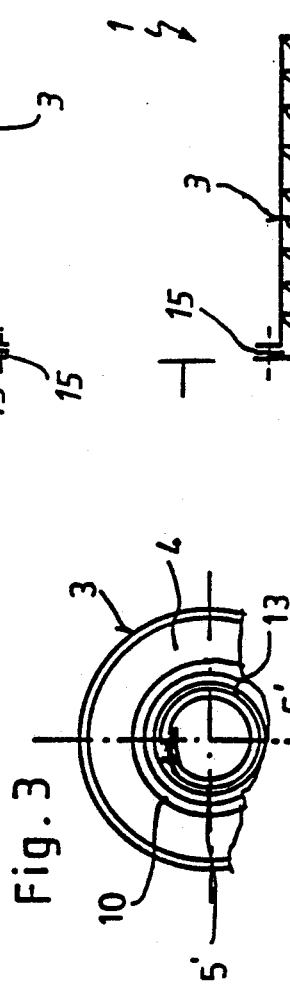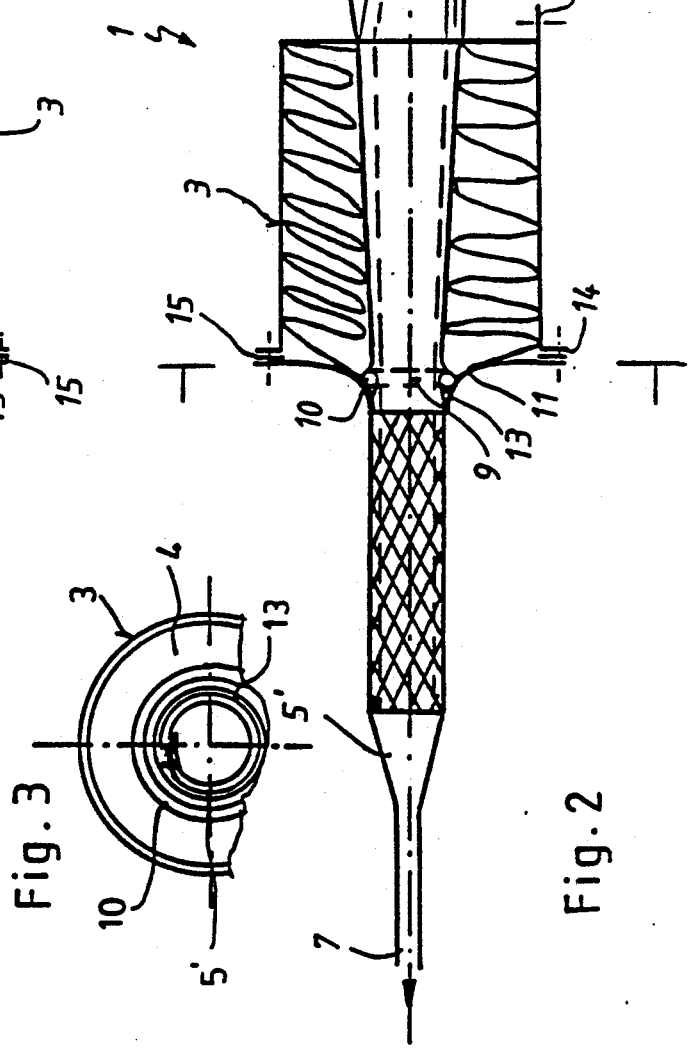
Fig. 1
Fig. 3
Fig. 2

METHOD AND APPARATUS FOR SHAPING BELT STRAPS TO ENABLE THEM TO BE PULLED THROUGH SUPPORT ROLLER STATIONS

BACKGROUND OF THE INVENTION

The invention relates to a method and to an apparatus for drawing in and pulling through tubular elastic belt straps into and through support roller stations arranged along a conveying path.

The drawing in and pulling through of tubular, flat belt straps (roller belts or belt bands or tubular conveyor belts) into and through support roller stations is connected with considerable difficulties which increase with increasing length of the conveying path. Such belt straps are drawn in manually with the use of a multitude of helpers attempting to hold the belt in its rolled-up shape. Since the belt strap which is shaped into a tube was manufactured as a flat belt strap, it tends to open in the unguided regions between the support roller stations. The forces required for this—in the circumferential direction on the one hand and in the longitudinal direction on the other hand—are considerable. It has been found, however, that in spite of the multitude of helpers, damage to the belt edges cannot be avoided when they are guided through the individual support roller stations since a new threading process must be performed in front of every support roller station.

SUMMARY OF THE INVENTION

It is the object of the invention to design a method and an apparatus with which the drawing in and pulling through of tubular, initially flat belt straps into and through support roller stations is simplified, with this being possible without greater effort with only a few helpers or even by machine.

This is accomplished with respect to the method in that the belt straps, before they are drawn into the support roller stations, are shaped into a tube which has a smaller diameter than the operating diameter, and they are maintained in this state while they are being pulled through the support roller stations. Due to the reduced diameter of the tube compared to the operating diameter, the respective belt strap to be pulled in can be brought through the individual support roller stations without problems and without greater efforts. Preferably, the belt straps are held in the reduced diameter state by an externally acting force, particularly a constant force, so that the overlapping belt edges are no longer able to escape from this fixed position. Damage to the belt edges during passage through the support roller stations is thus almost excluded.

According to a further idea of the invention, the belt straps are pulled through the support roller stations with the aid of a pulling means such as ropes or the like which have been guided previously through the support roller stations. Preferably the pulling force of the pulling means (rope) generates or maintains a tension to act on the circumference of the belt straps that have been shaped into a tube.

In the region of the respective reversal stations, the belt straps are opened up again, with the respective tubular belt strap being relaxed in the circumferential direction. Thereafter, the straps are reversed, for example around a reversal drum, whereupon the then flat belt strap is again shaped into a tube as already described and is brought in this state (reduced diameter) through return support roller stations for returning the belt strap.

In order for the pulling of the belt and/or net to be facilitated in the region of the shaping station, it is further proposed to introduce a sliding agent here, such as, for example, talcum or the like since a sliding friction (metal/rubber) exists in this region.

The drawing in and pulling through of the belt strap may be performed manually as well as by machine. In the latter case a winch, for example, winds up the rope while the belt strap is moved in the longitudinal direction. This measure is preferred, in particular, for longer conveying paths.

With respect to the apparatus, the problem is solved by a nozzle-like device having a decreasing diameter and being arranged in front of the first support roller station when seen in the direction of pulling. A chamber including a tensioning means which acts in the circumferential direction cooperates with the nozzle-like device. The tensioning means is preferably formed by a net sleeve disposed within the chamber and able to keep the tubular belt strap constantly within a given diameter range which is smaller than its operating diameter.

According to a further idea of the invention, the net chamber encloses the region of the smallest diameter of the nozzle-like device, with the net (net sleeve) being drawn onto the reduced diameter outer circumference of the belt straps through application of its inherent circumferential force for the purpose of drawing the strap into and pulling it through the support roller stations.

It is further proposed to divide the device, when seen in the longitudinal direction, so as to be able to remove it from an already drawn belt section. Preferably, a two-part configuration should here be selected, with both parts being connected with one another and being openable by means of hinges. The nozzle entrance is here also kept flat to correspond to the flat shape of the belt straps. For observation of belt behavior during the shaping process from the flat into the tubular shape, it is further proposed to make the belt entrance substantially open (advisably toward the top) at the nozzle entrance.

In the last section of the nozzle its diameter is smaller than the required operating diameter of the tubular belt strap. It must here be ensured that the diameter remains below the operating diameter also after the net sleeve has been pulled on so that problem-free guidance through the support roller stations can be ensured.

According to a further idea of the invention, the nozzle end is given a bead shape in order to prevent damage to the belt strap which has a tendency to come open and tends to undergo increased edge pressure at the end of the nozzle.

As already mentioned above, a chamber (drum) is arranged around the end region of the nozzle to serve as reservoir for the net (net sleeve). It is further proposed to provide the end face of the net chamber with a terminating cover in the region of the nozzle end. This cover forms, on the one hand, a stop for the net to be pulled out and, on the other hand, surrounds the region of the bead-like nozzle end and itself forms a further nozzle opening whose radial extension lies on the bead-like nozzle end with slight contact. The annular passage formed between the extension and the bead is here preferably dimensioned in such a way that the net can be pulled through with a braking effect. However, by means of intermediate rings provided in the region between the terminating cover and the net chamber, the annular passage can also be adapted to different net thicknesses.

Preferably, several monitoring openings are provided along the nozzle-like device and/or the net chamber. These openings can be closed by means of flaps and are provided to counteract possible operating malfunctions. Moreover, the overlap direction of the belt can be monitored and determined by means of these flaps.

The net surrounding the tubular belt strap under tension may be slit open in the region of its overlapping edges before or when the device is brought into action, thus relaxing the belt strap and giving it its operating diameter in that it supports itself at the surrounding support rollers of the support roller stations.

The features according to the invention make it possible to thread flat belt straps which have been shaped into a tube into the support roller stations and guide them through without constrictive resistances. The invention is suitable for stationary support rollers as well as for support roller garlands.

The invention is illustrated in the drawing and will now be described as follows.

BRIEF DESCRIPTION OF THE DRAWINGS

FIGS. 1 and 2 are basic sketches of the device according to the invention in various views; and FIG. 3 is a sectional view of the deformation/netting region.

DESCRIPTION OF THE PREFERRED EMBODIMENT

FIGS. 1 and 2 show the apparatus 1 according to the invention in various views. Shown are the following components: a nozzle-like device or nozzle 2, a chamber 3, a net 4 stored therein, the belt strap in its flat shape 5 and in its tubular or rolled-up state 5', a terminating cover 6 as well as cables 7 as pulling means. The belt strap in its flat shape 5 is introduced into the likewise flat nozzle entrance 8 which is open toward the top. Due to the decreasing diameter of nozzle-like device 2, belt strap 5 is brought into the tubular shape 5' and exits at a nozzle end 9. The diameter D is here less than the operating diameter determined by the spacing D' of the support rollers. Nozzle end 9 is provided with a bead 10 so as to avoid damage to the belt edges upon leaving. Terminating cover 6 is provided with a radial extension 11 which lies on bead 10 with a slight contact fit so that net 4 can be pulled out of chamber 3 with a slightly braking effect. Cables 7 pull the tubular belt strap 5' surrounded by net 4 through support roller station 12, which is indicated only schematically. Net 4 is automatically pulled through an annular chamber 13 formed between bead 10 and extension 11. In order to ensure optimum adaptation to various net thicknesses, further intermediate rings 15 may be introduced between an end face 14 of net chamber 3 and terminating cover 6. In order to permit monitoring of the folding or troughing process, openings 17 are provided which can be closed by means of flaps 16. The apparatus 1 can be connected with the floor or with other stationary devices by means of fastening connections 18.

FIG. 3 is a sectional view of the deformation/net encasing region. Visible are chamber 3, net 4 and the chamber receiving it, tubular belt 5', bead 10 as well as the annular chamber 13 formed between bead 10 and radial extension 11 (not shown in detail). Likewise schematically shown are hinges 20 which connect both parts of the nozzle-like device 2 together when the nozzle-like device 2 is constructed in its preferred two-part configuration, that is, divided along line 30 into two parts.

I claim:

1. A method of pulling a roller belt through a plurality of support roller stations disposed along a tubular roller belt conveying path, each support roller station defining an operating diameter of the tubular roller belt along the conveying path, said method comprising the steps of:

shaping the roller belt into a tubular roller belt having a smaller diameter than the operating diameter of the tubular roller belt, said shaping being performed before the roller belt is pulled through the plurality of support roller stations; and maintaining the smaller diameter of the tubular roller belt while the tubular roller belt is being pulled through the plurality of support roller stations.

2. A method according to claim 1, wherein said step of maintaining the smaller diameter comprises applying an externally acting force on the tubular roller belt.

3. A method according to claim 1, further comprising guiding a pulling means through the plurality of support roller stations prior to pulling the tubular roller belt through said plurality of support roller stations, and pulling the tubular roller belt through the plurality of support roller stations by the pulling means.

4. A method according to claim 3, wherein said step of pulling the tubular roller belt by the pulling means comprises at least one of generating and maintaining tension along a circumference of the tubular roller belt.

5. A method according to claim 1, further comprising the steps of providing a reversal station adjacent the plurality of support roller stations, exiting the tubular roller belt from the plurality of support roller stations, unfolding the tubular roller belt, reversing the roller belt unfolded in the previous step in the reversal station, and then shaping the roller belt into a tube having a smaller diameter than the operating diameter of the tubular roller belt, and guiding the tubular roller belt shaped in the immediately preceding step through a plurality of return support roller stations.

6. A method according to claim 1, further comprising coating a sliding agent on a surface of the tubular roller belt before performing said pulling step.

7. An apparatus for drawing a roller belt in a pulling direction through a support roller station arranged along a tubular roller belt conveying path, comprising:

a nozzle for forming a substantially flat roller belt into a tubular roller belt, said nozzle having a decreasing diameter when seen in the pulling direction;

a chamber disposed adjacent to and cooperating with said nozzle; and a tensioning means disposed in said chamber for tensioning a tubular roller belt in the circumferential direction, wherein said nozzle is disposed in front of and in axial alignment with said support roller station, with its smallest diameter portion nearest said support roller station, when said roller belt is drawn through said support roller station.

8. An apparatus according to claim 7, wherein said chamber comprises a net chamber, and said tensioning means comprises a net sleeve disposed within said net chamber.

9. An apparatus according to claim 8, wherein said net chamber surrounds a region of the smallest diameter of said nozzle, and said net sleeve comprises means for applying a circumferential force for drawing in and pulling a tubular roller belt when a force is applied to said net sleeve in the pulling direction, said net sleeve being drawn onto an outer circumference of a tubular roller belt when the force is applied in said pulling direction.

10. An apparatus according to claim 8, wherein a plurality of monitoring openings are disposed in a part of said nozzle, said monitoring openings being closable by flaps.

11. An apparatus according to claim 8, wherein a plurality of monitoring openings are disposed in a part of said net chamber, said monitoring openings being closable by flaps.

12. An apparatus according to claim 8, wherein said net sleeve can be slit open.

13. An apparatus according to claim 8, wherein said nozzle comprises a nozzle end spaced from said nozzle entrance, said nozzle end including a bead disposed about a periphery thereof.

14. An apparatus according to claim 13, wherein said net chamber comprises a terminating cover disposed adjacent said nozzle end.

15. An apparatus according to claim 14, wherein said terminating cover surrounds a region defined by said bead and defines a nozzle opening having a radial extension engaging said bead with slight contact.

16. An apparatus according to claim 15, wherein said extension and said nozzle end define an annular passage therebetween when a net sleeve is pulled therethrough in the pulling direction, said annular passage being configured for exerting a braking effect on said net sleeve being pulled therethrough in said pulling direction.

17. An apparatus according to claim 14, wherein intermediate rings adapted to the thickness of said net sleeve can be introduced between said terminating cover and said net chamber.

18. An apparatus according to claim 7, wherein said nozzle is divided along an axial center line into two halves, said nozzle being openable by a plurality of hinges attached to and connecting said halves.

19. An apparatus according to claim 7, wherein said nozzle has a substantially flat nozzle entrance configured to receive a substantially flat roller belt.

20. An apparatus according to claim 19, wherein in a region near said nozzle entrance said nozzle is substantially open toward one side.

* * * * *